(12) United States Patent
Liu et al.

(10) Patent No.: US 11,044,697 B2
(45) Date of Patent: Jun. 22, 2021

(54) PAGING METHOD AND PAGING APPARAUS

(71) Applicant: GUANGDONG OPPO MOBILE TELECOMMUNICATIONS CORP., LTD., Guangdong (CN)

(72) Inventors: Jianhua Liu, Dongguan (CN); Ning Yang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/496,874

(22) PCT Filed: Apr. 1, 2017

(86) PCT No.: PCT/CN2017/079317
§ 371 (c)(1),
(2) Date: Sep. 23, 2019

(87) PCT Pub. No.: WO2018/170948
PCT Pub. Date: Sep. 27, 2018

(65) Prior Publication Data
US 2020/0100207 A1 Mar. 26, 2020

(30) Foreign Application Priority Data
Mar. 23, 2017 (WO) ................ PCT/CN2017/077939

(51) Int. Cl.
*H04W 68/02* (2009.01)
*H04W 68/00* (2009.01)
*H04W 88/04* (2009.01)

(52) U.S. Cl.
CPC ......... *H04W 68/02* (2013.01); *H04W 68/005* (2013.01); *H04W 88/04* (2013.01)

(58) Field of Classification Search
CPC .... H04W 68/02; H04W 88/04; H04W 68/005
See application file for complete search history.

(56) References Cited

U.S. PATENT DOCUMENTS 8,837,325 B2 * 9/2014 Zhang ................... H04W 68/02
370/254
2012/0220214 A1 8/2012 Du
(Continued)

FOREIGN PATENT DOCUMENTS

CN 103491647 A 1/2014
CN 103888931 A 6/2014
(Continued)

OTHER PUBLICATIONS

3GPP TSG-RAN WG2 Meeting #97 Athens, Greece, Feb. 13-17, 2017 :R2/1701082.*
(Continued)

*Primary Examiner* — Sam Bhattacharya
(74) *Attorney, Agent, or Firm* — Ladas & Parry LLP

(57) ABSTRACT

Provided are a paging method and a paging apparatus. The method comprises: a network device receiving state information about a remote terminal device; the network device determining, according to the state information, a paging mode for paging the remote terminal device; and the network device paging the remote terminal device according to the paging mode. It can thus be ensured that a network device correctly pages a remote terminal device.

18 Claims, 4 Drawing Sheets

FIG. 1

(56) References Cited

U.S. PATENT DOCUMENTS

| | | | | |
|---|---|---|---|---|
| 2013/0322388 A1* | 12/2013 | Ahn | ............... | H04W 76/14 370/329 |
| 2015/0208452 A1* | 7/2015 | Lee | ............... | H04W 68/02 455/426.1 |
| 2016/0204847 A1 | 7/2016 | Ryu et al. | | |
| 2017/0245254 A1 | 8/2017 | Kitagawa et al. | | |
| 2018/0146507 A1 | 5/2018 | Tsuda et al. | | |

FOREIGN PATENT DOCUMENTS

| | | |
|---|---|---|
| CN | 104812069 A | 7/2015 |
| CN | 105474558 A | 4/2016 |
| CN | 106255227 A | 12/2016 |
| JP | 2009232027 A | 10/2009 |
| JP | 2012525737 A | 10/2012 |
| JP | 2013530806 A | 7/2013 |
| KR | 20090045183 A | 5/2009 |
| KR | 20120074255 A | 7/2012 |
| WO | 2011047503 A1 | 4/2011 |
| WO | 2016076395 A1 | 5/2016 |
| WO | 2016188680 A1 | 12/2016 |
| WO | 2016198936 A1 | 12/2016 |

OTHER PUBLICATIONS

Nokia et al: "Paging and Idle Mode procedures of remote UE", 3GPP Draft; R2-1701084 D2D Idle Mode V1.0, 3rd Generation Partnershiptproject (3GPP), Mobile Competence Centre; 650, Route Des Lucioles; F-06921 Sophia-Anti Polis Cedex; France Vol. RAN WG2, No. Athens, Greece; Feb. 13, 2017-Feb. 17, 2017 Feb. 12, 2017(Feb. 12, 2017), XP051211812, [retrieved on Feb. 12, 2017] * paragraph [0002]-paragraph [0003] *.

Nokia Alcatel-Lucent Shanghai Bell: "Paging and Idle mode mobility for OoC Remote UE",3GPP Draft; R2-168398 FED2D Iole Mobility V2,3rd Generation Partnershtp Project(3GPP), Mobile Competence Centre; 650, Route Des Lucioles;F-06921 Sophia-Antipolis Cedex; France vol. RAN WG2, No. Reno, USA;Nov. 14, 2016-Nov. 18, 2016 Nov. 13, 2016(Nov. 13, 2016), XP051176997, [retrieved on Nov. 13, 2016] * paragraph [0002] *.

Coolpad: "Discussion on RRC States and UE Behavior for eRemote UE", 3GPP Draft; R2-1701251, 3rd Generation Partnership Project (3GPP), Mobile Competence Centre; 650, Route Des Lucioles; F-06921 Sophia-Anti Polis Cedex; France Vol. RAN WG2, No. Athens, Greece; Feb. 13, 2017-Feb. 18, 2017 Feb. 12, 2017 (Feb. 12, 2017), XPO51211924, Remote UE and Relay UE connected via Non-3GPP radio; paragraph [0002]-paragraph [0004]*.

Supplementary European Search Report in European application No. 17902051.6, dated Nov. 28, 2019.

International Search Report in the international application No. PCT/CN2017/079317, dated Jan. 3, 2018.

Written Opinion of the International Search Authority in international application No. PCT/CN2017/079317, dated Jan. 3, 2018.

International Search Report in the international application No. PCT/CN2017/077939, dated Oct. 25, 2017.

Written Opinion of the International Search Authority in the international application No. PCT/CN2017/077939, dated Oct. 25, 2017.

3rd Generation Partnership Project; Technical Specification Group Services and System Aspects; Proximity-based services (ProSe); Stage 2 (Release 13), 3GPP TS 23.303 V13.2.0 (Dec. 2015), section 4.5.4.

3rd Generation Partnership Project; Technical Specification Group Radio Access Network; Evolved Universal Terrestrial Radio Access (E-UTRA); User Equipment (UE) procedures in idle mode (Release 13), 3GPP TS 36.304 V13.0.0 (Dec. 2015).

First Office Action of the Korean application No. 10-2019-7030855, dated Jan. 27, 2021.

Office Action of the Indian application No. 201917042085, dated Jan. 29, 2021.

First Office Action of the Japanese application No. 2019-551293, dated Mar. 16, 2021.

* cited by examiner

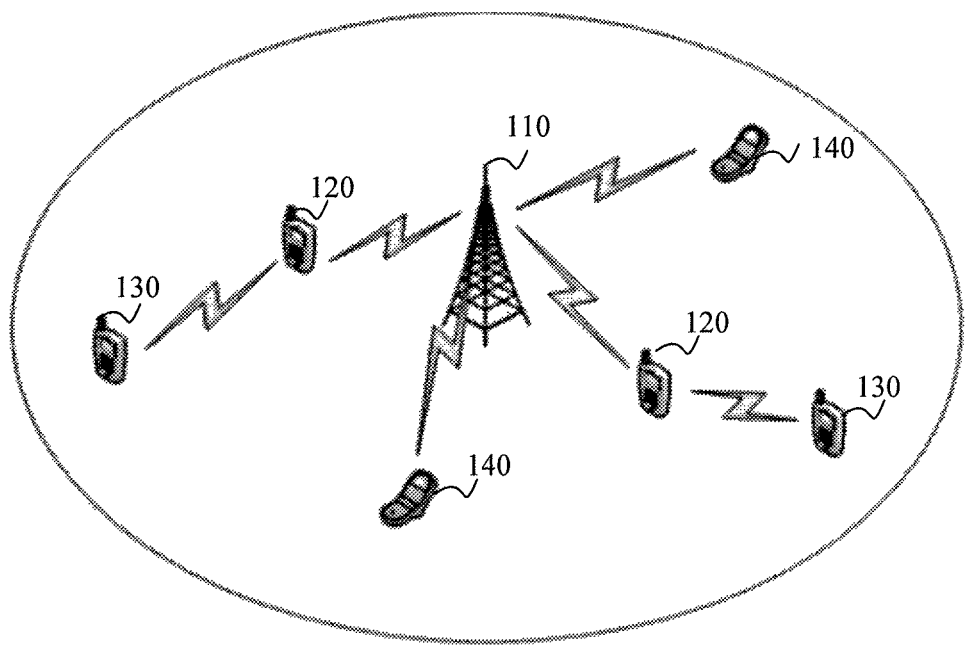

| A remote terminal device determines state information | S210 |

| The remote terminal device sends the state information to a network device, and the state information is used to determine a paging manner for paging the remote terminal device | S220 |

| A network device receives state information of a remote terminal device | S310 |

| The network device determines a paging manner for paging the remote terminal device based on the state information | S320 |

| The network device pages the remote terminal device in the paging manner | S330 |

FIG. 3

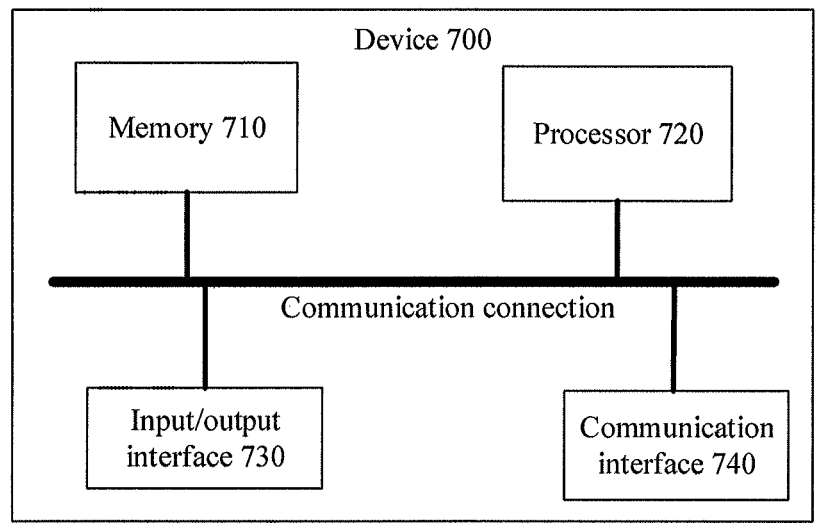
FIG. 7
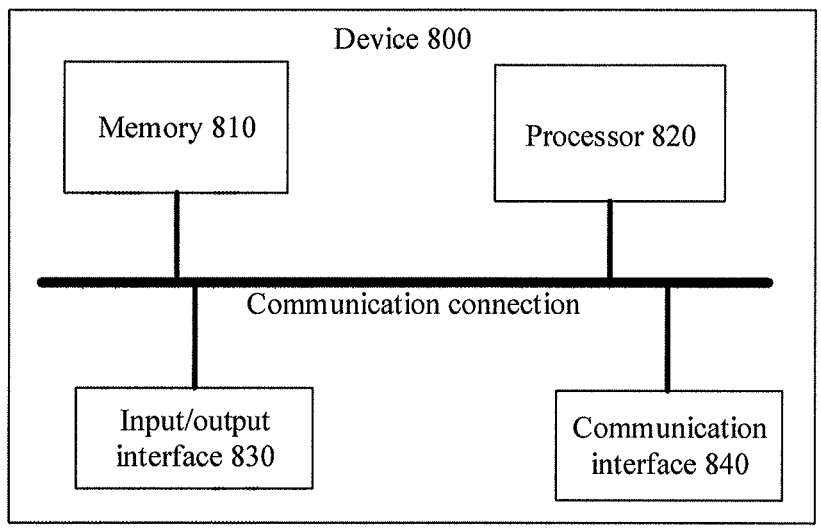
FIG. 8
1000
| A relay terminal device determines state information of a remote terminal device, and the state information is used by a network device to determine a paging manner for paging the remote terminal device | S1010 |
| --- | --- |
| The relay terminal device sends the state information to the network device | S1020 |
FIG. 9

PAGING METHOD AND PAGING APPARAUS

CROSS-INTERFERENCE TO RELATED APPLICATIONS

The present application is an application under 35 U.S.C. 371 of International Application No. PCT/CN2017/079317, filed on Apr. 1, 2017, which claims the benefit of PCT Application No. PCT/CN2017/077939, filed with the Patent Office of the People's Republic of China on Mar. 23, 2017 and entitled "PAGING METHOD AND PAGING DEVICE", the contents of each of which are hereby incorporated by reference in their entireties.

TECHNICAL FIELD

The embodiments of the disclosure relate to the field of communication, and particularly to a method for paging and a device for paging in the field of communication.

BACKGROUND

In a cellular communication system, a network device may send a paging message to a terminal device through an air interface message, and the terminal device receives the paging message of the network device. In a mixed scenario of cellular communication and device-to-device (D2D) communication, an urgent problem to be solved is how to correctly page the terminal device by the network device.

SUMMARY

The embodiments of the disclosure provide a method for paging and a device for paging, thereby ensuring that a network device correctly pages a remote terminal device.

A method for paging is provided in a first aspect, which includes operations as follows. A network device receives state information of a remote terminal device. The network device determines a paging manner for paging the remote terminal device based on the state information. The network device pages the remote terminal device in the paging manner.

Therefore, in the embodiments of the disclosure, the network device determines the paging manner for paging the remote terminal device based on the state information of the remote terminal device, thereby avoiding a paging failure caused by blind paging of the network device, and ensuring that the network device correctly pages the remote terminal device.

Optionally, the state information may be used to indicate whether the remote terminal device has a subscription relationship and/or a connection relationship with a relay terminal device, and/or indicate whether the remote terminal device is within coverage of a network.

Optionally, the state information may also be information about whether the terminal device is in a connected state, or information about whether the terminal device is in an idle state and the like. Content of the state information is not limited in the embodiments of the disclosure, and may be any information used by the network device to determine the paging manner.

Therefore, in the embodiments of the disclosure, the terminal device reports state information thereof, and the network device determines a manner for paging the terminal device based on the state information, thereby avoiding a paging failure caused in a case that the network device performs paging through an air interface message when the remote terminal device is out of the coverage of the network, and avoiding a paging failure caused in, a case that network device performs paging by the relay terminal device when the remote terminal device has no trust relationship with the relay terminal device. With the method for paging according to the embodiments of the disclosure, the network device performs paging based on the state information of the terminal device, thereby ensuring paging accuracy.

Optionally, the network device may be a first access network device having a connection relationship with the terminal device, the network device may also be a first core network device having a connection relationship with the terminal device, and the network device may also be at least one second access network device in the same network coverage area or the same paging area as the first access network device, which is not limited in the embodiments of the disclosure.

Optionally, in responsive to that the state information indicates whether the remote terminal device has the subscription relationship and/or the connection relationship with the relay terminal device, the operation that the state information indicates the subscription relationship and/or connection relationship between the remote terminal device and the relay terminal device may include operations as follows. The remote terminal device acquires the subscription relationship and/or the connection relationship, and sends the state information to the network device through the relay terminal device. Alternatively, the relay terminal device acquires the subscription relationship and/or the connection relationship and sends the state information to the network device.

Optionally, the state information may also indicate whether the remote terminal device has a trust relationship with the relay terminal device.

In some implementation, the paging manner includes paging through an air interface message or paging through a relay terminal device having the subscription relationship and/or the connection relationship with the remote terminal device. In some implementation, the operation that the network device determines the paging manner for paging the remote terminal device based on the state information includes operations as follows. If the state information indicates that the remote terminal device is within the coverage of the network, the network device determines that the paging manner for the remote terminal device is the paging through the air interface message.

In some implementation, the operation that the network device determines the paging manner for paging the remote terminal device based on the state information includes operations as follows. If the state information is used to indicate that the remote terminal device has the subscription relationship and/or the connection relationship with the relay terminal device, the network device determines that the paging manner for the remote terminal device is the paging through the relay terminal device.

In some implementation, the operation that the network device determines that the paging manner for the remote terminal device is the paging through the relay terminal device if the state information indicates that the remote terminal device has the subscription relationship and/or the connection relationship with the relay terminal device includes operations as follows. If the state information indicates that the remote terminal device has the subscription relationship and/or the connection relationship with the relay terminal device, and the remote terminal device is within the coverage of the network, the network device determines that the paging manner for the remote terminal device is the paging through the relay terminal device. In practical, the network device may also page the remote terminal device through the air interface message, which is not limited in the embodiments of the disclosure. Which paging manner is adopted may be determined according to specification of the protocol.

In some implementation, the operation that the network device determines the paging manner for paging the remote terminal device based on the state information includes operations as follows. If the state information indicates that the remote terminal device has no subscription relationship and/or connection relationship with the relay terminal device, and the remote terminal device is out of the coverage of the network, the network device determines that the paging manner for the remote terminal device is the paging through the relay terminal device.

In some implementation, the state information includes identification information of a network where the remote terminal device is located, and quality information on a link between the remote terminal device and a network device corresponding to the identification information of the network.

In some implementation, the state information includes identification information of the relay terminal device having the subscription relationship and/or the connection relationship with the remote terminal device and quality information on a link between the remote terminal device and the relay terminal device.

In some implementation, the operation that the network device receives the state information of the remote terminal device includes an operation as follows. The network device receives the state information sent by the remote terminal device through the air interface message.

Optionally, the first access network device receives the state information sent by the remote terminal device through the air interface message; or the at least one second access network device receives the state information sent by the remote terminal device through the air interface message; or the first core network device receives the state information sent by the remote terminal device through the air interface message.

In some implementation, the operation that the network device receives the state information of the remote terminal device includes an operation as follows. The network device receives the state information sent by the remote terminal device through the relay terminal device.

Optionally, the first access network device receives the state information sent by the remote terminal device through the relay terminal device; or the at least one second access network device receives the state information sent by the remote terminal device through the relay terminal device; or the first core network device receives the state information sent by the remote terminal device through the relay terminal device.

In some implementation, the network device is a first access network device. The first access network device may be an access network device connected with the remote terminal device. In this case, the remote terminal device may directly send the state information to the first access network device.

In some implementation, the operation that the network device receives the state information of the remote terminal device includes an operation as follows. The first access network device receives the state information, sent by the remote terminal device, of the remote terminal device.

In some implementation, the operation that the network device receives the state information of the remote terminal device includes an operation as follows. The first access network device receives the state information sent by a first core network device. The state information sent by the first core network device is sent to the first core network device by the remote terminal device.

Optionally, the network device may be the first access network device, the remote terminal device sends the state information to the first core network device, the first core network device sends the state information to the first access network device, and the first access network device determines the paging manner for paging the remote terminal device.

Optionally, the network device may also be the first core network device, and the first core network device may determine the paging manner for paging the remote terminal device and send information about the determined paging manner to the first access network device connected with the terminal device.

In some implementation, the network device is the first access network device, and the operation that the network device receives the state information of the remote terminal device includes an operation as follows. The first access network device receives the state information sent by at least one second access network device. The state information sent by the at least one second access network device is sent to the at least one second access network device by the remote terminal device.

Optionally, the network device may be the at least one second access network device, the remote terminal device sends the state information to the at least one second access network device, the at least one second access network device sends the state information to the first access network device, and the first access network device determines the paging manner for paging the remote terminal device. The at least one second access network device is different from the first access network device, the at least one second access network device and the first access network device may be access network devices within the coverage of the same network, or the at least one second access network device and the first access network device may be access network devices in the same paging area.

Optionally, the network device may also be the at least one second access network device. In this case, the at least one access network device may determine the paging manner for paging the remote terminal device and send the information about the determined paging manner to the first access network device connected with the terminal device.

In some implementation, the operation that the first access network device receives the state information sent by the first core network device includes operations as follows. The first access network device receives a first paging request message sent by the first core network device. The first paging request message carries the state information. Paging may be initiated by the first core network device. In this case, the first core network device, when the remote terminal device is to be paged, sends the first paging request message to the first access network device. The first paging request message carries the state information. The first access network device determines the paging manner based on the state information carried in the first paging request message.

Optionally, paging may be initiated by the first core network device. The first core network device determines the paging manner for paging the remote terminal device based on the received state information. When the first core network device requires paging the remote terminal device, the first core network device may carry information about the paging manner in the first paging request message, and send the first paging request message to the first access network device, and the first access network device pages the remote terminal device based on the information about the paging manner carried in the first paging request message.

In some implementation, the operation that the first access network device receives the state information sent by the at least one second access network device includes operations as follows. The first access network device receives a second paging request message sent by the at least one second access network device. The second paging request message carries the state information. Paging may be initiated by the at least one second access network device. In this case, the at least one second access network device, when the remote terminal device is to be paged, sends the second paging request message to the first access network device. The second paging request message carries the state information. The first access network device determines the paging manner based on the state information carried in the first paging request message.

Optionally, paging may be initiated by the at least one second access network device, the at least one second access network device determines the paging manner for paging the remote terminal device based on the received state information. When the at least one second access network device requires paging the remote terminal device, the at least one second access network device may carry the information about the paging manner in the second paging request message, and send the second paging request message to the first access network device. The first access network device pages the remote terminal device based on the information about the paging manner carried in the first paging request message.

A method for paging is provided in a second aspect, which includes operations as follows. A remote terminal device determines state information. The remote terminal device sends the state information to a network device, where the state information is used by the network device to determine a paging manner for paging the remote terminal device.

Optionally, the remote terminal device may receive or monitor a paging message sent by the network device.

Optionally, the state information is used to indicate whether the remote terminal device has a subscription relationship and/or a connection relationship with a relay terminal device, and/or indicate whether the remote terminal device is within coverage of a network.

In some implementation, the operation that the remote terminal device sends the state information to the network device includes an operation as follows. The remote terminal device sends the state information to the network device through an air interface message.

Optionally, the remote terminal device sends the state information to a first access network device through the air interface message; or the remote terminal device sends the state information to a first core network device through the air interface message; or the remote terminal device sends the state information to at least one second access network device through the air interface message.

In some implementation, the operation that the remote terminal device sends the state information to the network device includes an operation as follows. The remote terminal device sends the state information to the network device through the relay terminal device.

Optionally, the remote terminal device sends the state information to the first access network device through the relay terminal device; or the remote terminal device sends the state information to the first core network device through the relay terminal device; or the remote terminal device sends the state information to the at least one second access network device through the relay terminal device.

In some implementation, the operation that the remote terminal device determines the state information includes an operation as follows. The remote terminal device determines the state information based on quality information on a link between the remote terminal device and the network device.

In some implementation, the operation that the remote terminal device determines the state information includes an operation as follows. The state information is determined based on quality information between a link between the remote terminal device and a relay terminal device having the subscription relationship and/or the connection relationship with the remote terminal device.

In some implementation, the operation that the remote terminal device sends the state information to the network device includes an operation as follows. The remote terminal device sends the state information to the first access network device.

In some implementation modes, the operation that the remote terminal device sends the state information to the network device includes an operation as follows. The remote terminal device sends the state information to the first core network device.

In some implementation, the operation that the remote terminal device sends the state information to the network device includes an operation as follows. The remote terminal device sends the state information to the at least one second access network device, where the first access network device is different from the at least one second access network device.

In some implementation, after the operation that the remote terminal device sends the state information to the network device, the method further includes an operation as follows. The remote terminal device receives a paging message sent by the first access network device based on the state information.

In some implementation, the operation that the remote terminal device receives the paging message sent by the first access network device based on the state information includes an operation as follows. If the state information indicates that the remote terminal device is within the coverage of the network, the remote terminal device monitors an air interface message and receives the paging message sent by the first access network device through the air interface message.

In some implementation, the operation that the remote terminal device receives the paging message sent by the first access network device based on the state information includes an operation as follows. If the state information indicates that the remote terminal device has the subscription relationship and/or the connection relationship with the relay terminal device, the remote terminal device receives the paging message sent by the first access network device through the relay terminal device.

In some implementation, the operation that the remote terminal device receives the paging message sent by the first access network device through the relay terminal device if the state information indicates that the remote terminal device has the subscription relationship and/or the connection relationship with the relay terminal device includes operations as follows. If the state information indicates that the remote terminal device has the subscription relationship and/or the connection relationship with the relay terminal device and the remote terminal device is within the coverage of the network, the network device receives the paging message sent by the first access network device through the relay terminal device. In practical, the remote terminal device may also receive the paging message through the air interface message, which is not limited in the embodiments of the disclosure. The manner for receiving the paging message may be determined according to specification of the protocol or configuration of the network.

In some implementation, the operation that the remote terminal device receives the paging message sent by the first access network device based on the state information includes an operation as follows. If the state information indicates that the remote terminal device has no subscription relationship and/or connection relationship with the relay terminal device and the remote terminal device is out of the coverage of the network, the remote terminal device receives the paging message sent by the first access network device through the relay terminal device.

A device for paging is provided in a third aspect, which is configured to execute the method in the first aspect or any possible implementation of the first aspect. Specifically, the device includes units configured to execute the above method in the first aspect or any possible implementation of the first aspect.

A device for paging is provided in a fourth aspect, which is configured to execute the method in the second aspect or any possible implementation of the second aspect. Specifically, the device includes units configured to execute the above method in the second aspect or any possible implementation of the second aspect.

A system for paging is provided in a fifth aspect, which includes the device in the third aspect or any optional implementation of the third aspect and the device in the fourth aspect or any optional implementation of the fourth aspect.

A device for paging is provided in a sixth aspect, which may include a memory, a processor, an input/output interface and a communication interface. The memory, the processor, the input/output interface and the communication interface are connected communicatively. The memory is configured to store an instruction, and the processor is configured to execute the instruction stored in the memory. When the instruction is executed, the processor executes the method in the first aspect through the communication interface and controls the input/output interface to receive inputted data and information and output data such as an operation result.

A device for paging is provided in a seventh aspect, which may include a memory, a processor, an input/output interface and a communication interface. The memory, the processor, the input/output interface and the communication interface are connected communicatively. The memory is configured to store an instruction, and the processor is configured to execute the instruction stored in the memory. When the instruction is executed, the processor executes the method in the second aspect through the communication interface and controls the input/output interface to receive inputted data and information and output data such as an operation result.

A computer-readable medium is provided in an eighth aspect, which stores a program code to be executed by a terminal device. The program code includes an instruction configured to execute the method in the first aspect or each implementation of the first aspect.

A computer-readable medium is provided in a ninth aspect, which stores a program code to be executed by a network device. The program code includes an instruction configured to execute the method in the second aspect or each implementation of the second aspect.

A method for paging is provided in a tenth aspect, which includes operations as follows. A relay terminal device determines state information of a remote terminal device, where the state information is used by a network device to determine a paging manner for paging the remote terminal device. The relay terminal device sends the state information to the network device.

According to the method for paging of the disclosure, the relay terminal device sends the state information of the remote terminal device to the network device, the network device determines the paging manner for paging the remote terminal device based on the received state information, thereby avoiding a paging failure caused by blind paging of the network device, and ensuring that the network device correctly pages the remote terminal device.

Optionally, the state information is used to indicate whether the remote terminal device has a subscription relationship and/or a connection relationship with the relay terminal device, and/or indicate whether the remote terminal device is within coverage of a network.

Optionally, the state information may also indicate whether the remote terminal device has a trust relationship with the relay terminal device.

In some implementation, the operation that the relay terminal device sends the state information to the network device includes an operation as follows. The relay terminal device sends the state information to the network device through an air interface message.

In some implementation, the network device is a first access network device.

The operation that the relay terminal device sends the state information to the network device includes operations as follows.

The relay terminal device sends the state information to the first access network device.

Alternatively, the relay terminal device sends the state information to a first core network device, and the first core network device is configured to send the state information to the first access network device.

Alternatively, the relay terminal device sends the state information to at least one second access network device, and the at least one second access network device is configured to send the state information to the first access network device.

In some implementation, the method further includes operations as follows. The relay terminal device receives a paging message sent by the first access network device, and the relay terminal device sends the paging message to the remote terminal device.

A device for paging is provided in an eleventh aspect, which is configured to execute the above method in the tenth aspect or any possible implementation of the tenth aspect. Specifically, the device includes function modules configured to execute the above method in the tenth aspect or any possible implementation of the tenth aspect.

A device for paging is provided in a twelfth aspect, which may include a memory, a processor, an input/output interface and a communication interface. The memory, the processor, the input/output interface and the communication interface are connected communicatively, the memory is configured to store an instruction, and the processor is configured to execute the instruction stored in the memory. When the instruction is executed, the processor executes the method in the tenth aspect or any implementation mode of the tenth aspect through the communication interface, and controls the input/output interface to receive inputted data and information and output data such as an operation result.

A computer-readable medium is provided in a thirteenth aspect, which stores a program code to be executed by a terminal device. The program code includes an instruction used to execute the method in the tenth aspect or each implementation of the tenth aspect.

BRIEF DESCRIPTION OF DRAWINGS

FIG. 1 is a schematic diagram showing an application scenario according to an embodiment of the disclosure.

FIG. 2 is a schematic diagram showing a method for paging according to an embodiment of the disclosure.

FIG. 3 is a schematic diagram showing another method for paging according to an embodiment of the disclosure.

FIG. 7 is a schematic diagram showing a device for paging according to an embodiment of the disclosure.

FIG. 8 is a schematic diagram showing another device for paging according to an embodiment of the disclosure.

FIG. 9 is a schematic diagram showing another method for paging according to an embodiment of the disclosure.

DETAILED DESCRIPTION

Figure 4:
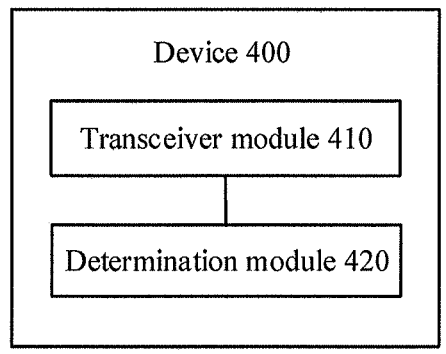
FIG. 4 is a schematic diagram showing a device for paging according to an embodiment of the disclosure.

It is to be understood that the technical solutions of the embodiments of the disclosure may be applied to various communication systems, such as, a global system of mobile communication (GSM), a code division multiple access (CDMA) system, a wideband code division multiple access (WCDMA) system, a general packet radio service (GPRS), a long term evolution (LTE) system, an LTE frequency division duplex (FDD) system, LTE time division duplex (TDD), a universal mobile telecommunication system (UMTS), a worldwide interoperability for microwave access (WiMAX) communication system, a wireless local area network (WLAN) or a future fifth. Generation (5G) system.

In the embodiments of the disclosure, a terminal device may be called user equipment (UE), a terminal device, a mobile station (MS), a mobile terminal, a terminal device in the future 5G network or the like. The terminal device may communicate with one or more core networks through a radio access network (RAN). For example, a terminal may be a mobile phone (or called a cellular phone) and a computer having a mobile terminal. For example, the terminal may also be a portable mobile device, a pocket-size mobile device, a handheld mobile device, a computer-embedded mobile device or a vehicle-mounted mobile device, and exchange voice and/or data with the radio access network.

In the embodiments of the disclosure, an access network device may be a base station controller (BSC) in the GSM or CDMA, may also be a radio node controller (RNC) in WCDMA, and may also be an evolved node B (abbreviated as eNB or e-NodeB) in LTE, or a relay station or access point, or a vehicle-mounted device, a wearable device and an access network device in the future 5G network, which is not limited in the disclosure.

In the embodiments of the disclosure, a core network device includes a mobility management entity (MME) and a serving general packet radio service (GPRS) support node (SGSN).

FIG. 1 is a schematic diagram showing an application scenario according to an embodiment of the disclosure, which includes a network device 110, a relay terminal device 120, a remote terminal device 130 and a cellular terminal device 140.

The network device 110 is configured to perform communication with a cellular terminal device 140 through an air interface, and also configured to communicate with the remote terminal device 130 through the relay terminal device 120. For example, the network device 110 may send a paging message to the relay terminal device 120. The paging message is used to page the remote terminal device 130.

The relay terminal device 120 is configured to communicate with the network device 110, or is configured to communicate with the remote terminal device 130, or is configured to forward uplink data of the remote terminal device 130 to the network device 110, and may also be configured to forward downlink data of the network device 110 to the remote terminal device 130. Communication between the relay terminal device 120 and the remote terminal device 130 may be called D2D communication. D2D communication is a direct communication technology between terminal devices. The neighboring relay terminal device 120 and remote terminal device 130 perform data transmission through a direct-connected link without forwarding of the network device 110. Communication between the relay terminal device 120 and the remote terminal device 130 has the following advantages. The communication has a high data rate, a short delay and low power consumption within large network coverage, and raises a utilization rate of a frequency resource and obtains a space division multiplexing gain of the resource. It is to be understood that, in the embodiment of the disclosure, the D2D refers to a direct communication technology for a terminal sharing licensed frequency band resources with a cellular system, to form a uniform hybrid cellular and D2D network.

The remote terminal device 130 is configured to communicate with the relay terminal device 120. Alternatively, in responsive to that the remote terminal device 130 is within coverage of the network device 110, the remote terminal device 130 may directly communicate with the network device 110. In responsive to that the remote terminal device 130 is out of the coverage of the network device 110, the remote terminal device 130 may communicate with the network device 110 through the relay terminal device 120.

The cellular terminal device 140 is configured to directly communicate with the network device 110 in a cellular communication manner.

It is to be understood that, in the application scenario of the embodiment of the disclosure, in responsive to that the relay terminal device 120 assists the remote terminal device 130 to communicate with the network device 110, a D2D communication mode is used between the remote terminal device 130 and the relay terminal device 120, and a cellular communication mode is used between the relay terminal device 120 and the network device. The relay terminal device 120 receives and forwards data in a half-duplex manner, and in a receiving and forwarding process, switches the cellular communication mode to the D2D communication mode, or switches the D2D communication node to the cellular communication mode. FIG. 2 is a schematic flowchart showing a method 200 for paging according to an embodiment of the disclosure. FIG. 2 shows steps or operations of the method for paging provided in the embodiment of the disclosure. However, these steps or operations are only exemplary. Other operations or variants of each operation in FIG. 2 may also be executed in the embodiment of the disclosure. The method 200 includes S210 and S220.

In S210, a remote terminal device determines state information. Optionally, the state information is used to indicate whether the remote terminal device has a subscription relationship and/or a connection relationship with a relay terminal device, and/or indicate whether the remote terminal device is within coverage of a network.

In S220, the remote terminal device sends the state information to a network device. The state information is used to determine a paging manner for paging the remote terminal device.

FIG. 3 is a schematic flowchart showing a method 300 for paging according to an embodiment of the disclosure. FIG. 3 shows steps or operations of the method for paging provided in the embodiment of the disclosure. However, these steps or operations are only exemplary. Other operations or variants of each operation in FIG. 3 may also be executed in the embodiment of the disclosure. The method 300 includes S310 to S330.

In S310, a network device receives state information of a remote terminal device.

Optionally, the state information is used to indicate whether the remote terminal device has a subscription relationship and/or a connection relationship with a relay terminal device, and/or indicate whether the remote terminal device is within coverage of a network.

In S320, the network device determines a paging manner for paging the remote terminal device based on the state information.

Optionally, the paging manner includes paging through an air interface message or paging through a relay terminal device having the subscription relationship and/or the connection relationship with the remote terminal device.

In S330, the network device pages the remote terminal device in the paging manner.

In the embodiment of the disclosure, the terminal device reports state information thereof, and the network device determines a manner for paging the terminal device based on the state information. For example, in responsive to that the state information indicates that the remote terminal device has the subscription relationship and/or the connection relationship with, the relay terminal device, the network device may determine to send a paging message to the remote terminal device through the relay terminal device, and the remote terminal device receives the paging message sent by the relay terminal device. In responsive to that the state information indicates that the remote terminal device is presently within the coverage of the network, the network device may send the paging message to the remote terminal device through the air interface message, and the remote terminal device monitors the paging message at an air interface. In this manner, the network device may select different manners to page the remote terminal device based on different state information of the remote terminal device, thereby avoiding a paging failure caused in a case that the network device performs paging through an air interface message when the remote terminal device is out of the coverage of the network, and avoiding a paging failure caused in a case that network device performs paging by the relay terminal device when the remote terminal device has no trust relationship with the relay terminal device. With the method for paging of the embodiments of the disclosure, paging accuracy can be ensured.

In an optional embodiment, S210 includes operations as follows. The remote terminal device determines the state information based on quality information on a link between the remote terminal device and the network device within the coverage of the network, and/or based on quality information on a link between the remote terminal device and a relay terminal device having the subscription relationship and/or the connection relationship with the remote terminal device. Therefore, the state information includes identification information of the network where the remote terminal device is located, and quality information on a link between the remote terminal device and a network device corresponding to the identification information of the network, and/or, the state information includes identification information of the relay terminal device having the subscription relationship and/or the connection relationship with the remote terminal device, and the quality information on a link between the remote terminal device and the relay terminal device.

Specifically, the remote terminal device may determine the quality information on the link based on received reference signal receiving power (RSRP). For example, in responsive to that the RSRP is greater than a first threshold value, a present link quality may be considered to meet a communication requirement, and thus the remote terminal device may be considered to be within the coverage of the network. In responsive to that the RSRP is less than or equal to the first threshold value, the present link quality may be considered not to meet the communication requirement, and the remote terminal device may be considered to be out of the coverage of the network. The remote terminal device may report information on the link quality which meets the communication requirement, and may also report information on the link quality which does not meet the communication requirement, which is not limited in the embodiment of the disclosure. The remote terminal device may also determine whether the remote terminal device has the subscription relationship and/or the connection relationship with the relay terminal device based on quality of a link between the remote terminal device and the relay terminal device. In responsive to that RSRP between the remote terminal device and the relay terminal device is greater than a second threshold value, it may be considered that the remote terminal device has the subscription relationship and/or the connection relationship with the relay terminal device. In responsive to that the RSRP between the remote terminal and the relay terminal device is less than or equal to the second threshold value, it may be considered that the remote terminal device has no subscription relationship and/or connection relationship with the relay terminal device. The remote terminal device may report information indicating that there is the subscription relationship and/or the connection relationship, and may also report information indicating that there is no subscription relationship and/or connection relationship, which is not limited in the embodiments of the disclosure. In practical, besides the remote terminal device can report the information about whether there is the subscription relationship and/or the connection relationship between the remote terminal device and the relay terminal device, the relay terminal device may also report the information about whether there is the subscription relationship and/or the connection relationship between the relay terminal device and the remote terminal device, which is not limited in the embodiments of the disclosure.

As an optional embodiment, S220 includes an operation as follows. The remote terminal device sends the state information to the network device through an air interface message. S310 includes an operation as follows. The network device receives the state information through the air interface message. Specifically, in responsive to that the remote terminal device determines that the remote terminal device within the coverage of the network, the remote terminal device sends the state information to the network device through the air interface message. In responsive to that the remote terminal device determines that the remote terminal device is out of the coverage of the network, the remote terminal device sends the state information to the network device through the relay terminal device. That is, in this case, the remote terminal device determines whether the remote terminal device is within the coverage of the network device. If the remote terminal device is within the coverage of the network device, the remote terminal device reports the state information by the air interface message. If the remote terminal device is not within the coverage of the network device, the remote terminal device reports the state information by the relay terminal device.

As an optional embodiment, S220 includes an operation as follows. The remote terminal device sends the state information through the relay terminal device. S310 includes an operation as follows. The network device receives the state information sent by the remote terminal device through the relay terminal device. Specifically, in responsive to that the remote terminal device determines that the remote terminal device has the subscription relationship and/or the connection relationship with the relay terminal device, the remote terminal device determines to report the state information to the network device by the relay terminal device. In this case, the remote terminal device determines whether the remote terminal device has the subscription relationship and/or the connection relationship with the relay terminal device. If the remote terminal device has the subscription relationship and/or the connection relationship with the relay terminal device, the remote terminal device reports the state information to the network device by the relay terminal device. More specifically, when the remote terminal device determines that the remote terminal device has no subscription relationship and/or connection relationship with the relay terminal device, the remote terminal device determines whether the remote terminal device is within the coverage of the network. If the remote terminal device is within the coverage of the network, the state information is reported by the air interface message. If remote terminal device is out of the coverage of the network, the state information is reported by the relay terminal device.

As an optional embodiment, the network device is a first access network device. S220 includes an operation as follows. The remote terminal device sends the state information to the first access network device. S310 includes an operation as follows. The first access network device receives the state information of the remote terminal device.

As an optional embodiment, S220 includes operations as follows. The remote terminal device sends the state information to a first core network device, and the first core network device sends the state information to the first access network device. S310 includes an operation as follows. The first access network device receives the state information sent by the first core network device. Optionally, the first core network device sends the state information to the first access network device through a first paging request message, and the first access network device receives the first paging request message sent by the first core network device. The first paging request message carries the state information.

As an optional embodiment, S220 includes operations as follows. The remote terminal device sends the state information to at least one second access network device, and the at least one second access network device sends the state information to the first access network device. S310 includes an operation as follows. The first access network device receives the state information sent by the at least one second access network device. Optionally, the at least one second access network device sends the state information to the first access network device through a second paging request message, and the first access network device receives the second paging request message sent by the at least one second access network device. The second paging request message carries the state information.

It is to be understood that, in the embodiment of the disclosure, there are three manners for reporting the state information. In a first manner, the remote terminal device may directly report the state information to a first access network device having the connection relationship with the remote terminal device, and the first access network device determines the paging manner for paging the remote terminal device based on the state information. In a second manner, the remote terminal device may report the state information to a first core network device having the connection relationship with the remote terminal device, the first core network device sends the state information to the first access network device, and the first access network device determines the manner for paging the remote terminal device based on the state information. Alternatively, the first core network device determines the paging manner for paging the remote terminal device based on the state information, and sends information about the paging manner to the first access network device. For example, the information about the paging manner may be identification information of the relay terminal device and the like, which is not be limited in the embodiment of the disclosure. In a third manner, the remote terminal device may report the state information to the at least one second access network device, the at least one second access network device sends the state information to the first access network device, and the first access network device determines the manner for paging the remote terminal device based on the state information. Alternatively, the at least one second access network device determines the paging manner for paging the remote terminal device based on the state information, and sends the information about the paging manner to the first access network device. For example, the information about the paging manner may be the identification information of the relay terminal device and the like. It is to be noted that the first access network device and the at least one second access network device may be access network devices within the coverage of the same first core network device, or access network devices in the same paging area, which is not limited in the embodiment of the disclosure. In practical, the first access network device is different from each: of the at least one second access network device.

The network device determines the paging manner for paging the remote terminal device based on the state information in the following ways.

In a first way, if the state information indicates that the remote terminal device is within the coverage of the network, the network device determines that the paging manner for the remote terminal device is paging through the air interface message. In this way, if the state information indicates that the remote terminal device is within the coverage of the network, the network device sends, a paging message by the air interface message no matter whether the remote terminal device has the subscription relationship and/or the connection relationship with the relay terminal device.

In a second way, if the state information indicates that the remote terminal device has the subscription relationship and/or the connection relationship with the relay terminal device, the network device determines that the paging manner for the remote terminal device is paging through the relay terminal device. In this way, if the state information indicates that the remote terminal device has the subscription relationship and/or the connection relationship with the relay terminal device, the network device sends the paging message by the relay terminal device no matter whether the remote terminal device is within the coverage of the network.

In a third way, if the state information indicates that the remote terminal device has the subscription relationship and/or the connection relationship with the relay terminal device, and the remote terminal device is within the coverage of the network, the network device determines that the paging manner for the remote terminal device is paging through the relay terminal device.

In fourth way, if the state information indicates that the remote terminal device has the subscription relationship and/or the connection relationship with the relay terminal device, and the remote terminal device is within the coverage of the network, the network device determines that the paging manner for the remote terminal device is paging through the air interface message.

In a fifth way, if the state information indicates that the remote terminal device has no subscription relationship and/or connection relationship with the relay terminal device, and the remote terminal device is out of the coverage of the network, the network device determines that the paging manner for the remote terminal device is paging through the relay terminal device.

As an optional embodiment, after the operation that the remote terminal device sends the state information to the network device, the method 200 further includes an operation as follows. The remote terminal device receives a paging message sent by the first access network device based on the state information.

The remote terminal device receives the paging message sent by the first access network device based on the state information in the following manners.

In a first manner, if the state information indicates that the remote terminal device is within the coverage of the network, the remote terminal device monitors an air interface message and receives the paging message sent by the first access network device through the air interface message. In this manner, if the state information indicates that the remote terminal device is within the coverage of the network, the remote terminal device receives the paging message by the air interface message no matter whether the remote terminal device has the subscription relationship and/or the connection relationship with the relay terminal device.

In a second manner, if the state information indicates that the remote terminal device has the subscription relationship and/or the connection relationship with the relay terminal device, the remote terminal device receives the paging message sent by the first access network device through the relay terminal device. In this manner, if the state information indicates that the remote terminal device has the subscription relationship and/or the connection relationship with the relay terminal device, the network device receives the paging message by the relay terminal device no matter whether the remote terminal device is within the coverage of the network.

In a third manner, if the state information indicates that the remote terminal device has the subscription relationship and/or the connection relationship with the relay terminal device, and the remote terminal device is within the coverage of the network, the remote terminal device receives the paging message sent by the first access network device through the relay terminal device.

In a fourth manner, if the state information indicates that the remote terminal device has the subscription relationship and/or the connection relationship with the relay terminal device and the remote terminal device is within the coverage of the network, the remote terminal device monitors the air interface message and receives the paging message sent by the first access network device through the air interface message.

In a fifth manner, if the state information indicates that the remote terminal device has no subscription relationship and/or connection relationship with the relay terminal device and the remote terminal device is out of the coverage of the network, the remote terminal device receives the paging message sent by the first access network device through the relay terminal device.

It is to be understood that the remote terminal device receives the paging message in any one of the above five manners, and the network device may send the paging message in the way corresponding to the above manner. Specifically, if the terminal device receives the paging message in the first manner, the network device sends the paging message in the first way. If the terminal device receives the paging message in the second manner, the network device sends the paging message in the second way. If the terminal device receives the paging message in the third manner, the network device sends the paging message in the third way. If the terminal device receives the paging message in the fourth manner, the network device sends the paging message in the fourth way. If the terminal device receives the paging message in the fifth manner, the network device sends the paging message in the fifth way. Which manner is adopted may be determined according to specification of the protocol or configuration of the network, which is not be limited in the embodiment of the disclosure.

It is to be noted that, in the embodiment of the disclosure, whether the remote terminal device is within the coverage of the network may be determined by determining whether the remote terminal device is within coverage of an access network device, or whether the remote terminal device is within coverage of a core network device, or whether the remote terminal device is within coverage of multiple access network devices in the same paging area. The network, within the coverage of which the terminal device is, is determined, and then the state information may be determined to be identification information of the network, and quality information on a link between the terminal device and the network.

FIG. 4 is a schematic block diagram of a device 400 for paging according to an embodiment of the disclosure. The device may be the network device in the method 300. As shown in FIG. 4, the device 400 includes a transceiver module 410 and a determination module 420.

The transceiver module 410 is configured to receive state information of a remote terminal device.

The determination module 420 is configured to determine a paging manner for paging the remote terminal device based on the state information.

The transceiver module 410 is further configured to page the remote terminal device in the paging manner.

As an optional embodiment, the state information is used to indicate whether the remote terminal device has a subscription relationship and/or a connection relationship with a relay terminal device, and/or indicate whether the remote terminal device is within coverage of a network.

As an optional embodiment, the paging manner includes paging through an air interface message or paging through a relay terminal device having the subscription relationship and/or the connection relationship with the remote terminal device.

As an optional embodiment, the determination module 420 is configured to, if the state information indicates that the remote terminal device is within the coverage of the network, determine that the paging manner for the remote terminal device is the paging through the air interface message.

As an optional embodiment, the determination module 420 is further configured to, if the state information indicates that the remote terminal device has the subscription relationship and/or the connection relationship with the relay terminal device, determine that the paging manner for the remote terminal device is the paging through the relay terminal device.

As an optional embodiment, the determination module 420 is further configured to, if the state information indicates that the remote terminal device has the subscription relationship and/or the connection relationship with the relay terminal device and the remote terminal device is within the coverage of the network, determine that the paging manner for the remote terminal device is the paging through the relay terminal device.

As an optional embodiment, the determination module 420 is further configured to, if the state information indicates that the remote terminal device has no subscription relationship and/or connection relationship with the relay terminal device and the remote terminal device is out of the coverage of the network, determine that the paging manner for the remote terminal device is the paging through the relay terminal device.

As an optional embodiment, the state information includes identification information of a network where the remote terminal device is located, and quality information on a link between the remote terminal device and a network device corresponding to the identification information of the network, and/or the state information includes identification information of the relay terminal device having the subscription relationship and/or the connection relationship with the remote terminal device and quality information on a link between the remote terminal device and the relay terminal device.

As an optional embodiment, the transceiver module 410 is configured to receive the state information sent by the remote terminal device through an air interface message, or receive the state information sent by the remote terminal device through the relay terminal device.

As an optional embodiment, the device 400 is a first access network device, and the transceiver module 410 is further configured to receive the state information sent by a first core network device, where the state information sent by the first core network device is sent to the first core network device by the remote terminal device; or receive the state information sent by at least one second access network device, where the state information sent by the at least one second access network device is sent to the at least one second access network device by the remote terminal device.

As an optional embodiment, the transceiver module is further configured to:
receive a first paging request message sent by the first core network device, where the first paging request message carries the state information.

As an optional embodiment, the transceiver module is further configured to:
receive, by the first access network device, a second paging request message sent by the at least one second access network device, where the second paging request message carries the state information.

Figure 5:
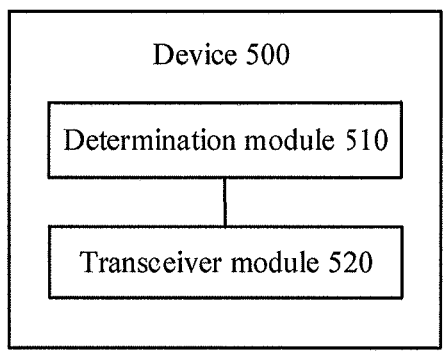
FIG. 5 is a schematic diagram showing another device for paging according to an embodiment of the disclosure.

FIG. 5 is a schematic block diagram of a device 500 for paging according to an embodiment of the disclosure. The device may be the terminal device in the method 200. As shown in FIG. 5, the device 500 includes a determination module 510 and a transceiver module 520.

The determination module 510 is configured to determine state information.

The transceiver module 520 is configured to send the state information to a network device, where the state information is used by the network device to determine a paging manner for paging a remote terminal device.

As an optional embodiment, the state information is used to indicate whether the remote terminal device has a subscription relationship and/or a connection relationship with a relay terminal device, and/or to indicate whether the remote terminal device is within coverage of a network.

As an optional embodiment, the transceiver module 520 is configured to send the state information to the network device through an air interface message, or send the state information to the network device through the relay terminal device.

As an optional embodiment, the determination module 510 is configured to determine the state information based on quality information on a link between the device 500 and the network device, and/or, based on quality information on a link between the device and a relay terminal device having the subscription relationship and/or the connection relationship with the device.

As an optional embodiment, the transceiver module 520 is configured to send the state information to a first access network device, or send the state information to a first core network device, or send the state information to at least one second access network device. The first access network device is different from the at least one second access network device.

As an optional embodiment, the transceiver module 520 is further configured to, after the state information is sent to the network device, receive a paging message sent by the first access network device based on the state information.

As an optional embodiment, the transceiver module 520 is further configured to, if the state information indicates that the device is within the coverage of the network, monitor an air interface message and receive the paging message sent by the first access network device through the air interface message.

As an optional embodiment, the transceiver module 520 is further configured to, if the state information indicates that the device has the subscription relationship and/or the connection relationship with the relay terminal device, receive the paging message sent by the first access network device through the relay terminal device.

As an optional embodiment, the transceiver module 520 is further configured to, if the state information indicates that the device 500 has the subscription relationship and/or the connection relationship with the relay terminal device and the device is within the coverage of the network, receive the paging message sent by the first access network device through the relay terminal device.

As an optional embodiment, the transceiver module 520 is further configured to, if the state information indicates that the device has no subscription relationship and/or connection relationship with the relay terminal device and the remote terminal device is out of the coverage of the network, receive the paging message sent by the first access network device through the relay terminal device.

Figure 6:
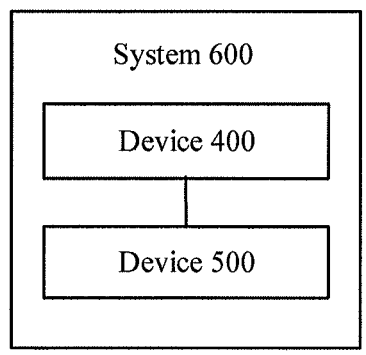
FIG. 6 is a schematic diagram showing a system for paging according to an embodiment of the disclosure.

FIG. 6 is a schematic diagram showing a system 600 for paging according to an embodiment of the disclosure, which includes a device 400 and a device 500.

FIG. 7 is a schematic block diagram showing a device 700 for paging according to an embodiment of the disclosure. For example, the device may be the network device in the method 300. As shown in FIG. 7, the device 700 includes a memory 710, a processor 720, an input/output interface 730 and a communication interface 740. Herein, the memory 710, the processor 720, the input/output interface 730 and the communication interface 740 are connected through an internal connection path. The memory 710 is configured to store an instruction. The processor 720 is configured to execute the instruction stored in the memory 720 to control the input/output interface 730 to receive inputted data and information and output data such as an operation result, and control the communication interface 740 to send a signal.

The input/output interface 730 is configured to receive state information of a remote terminal device. The processor 720 is configured to determine a paging manner for paging the remote terminal device based on the state information. The input/output interface 730 is further configured to page the remote terminal device in the paging manner.

It is to be understood that, in the embodiment of the disclosure, the processor 720 may use a universal central processing unit (CPU), a microprocessor, an application specific integrated circuit (ASIC) or one or more integrated circuits, to execute a related program to implement the technical solution provided in the embodiment of the disclosure.

It is also to be understood that the communication interface 740 uses but is not limited to, for example, a transceiver device such as a transceiver, to implement communication between the device 700 and another device or a communication network.

The memory 710 may include a read-only memory and a random access memory, and provides an instruction and data for the processor 720. A part of the memory 720 may further include a non-volatile random access memory. For example, the memory 720 may further store type information of a device.

It is to be understood that the device 700 may correspond to the network device in the method 300, and may realize corresponding functions of the network device in the method 300, which is not be elaborated herein for simplicity.

FIG. 8 is a schematic block diagram of a device 800 for paging according to an embodiment of the disclosure. The device may be the terminal device in the method 200. As shown in FIG. 8, the device 800 includes a memory 810, a processor 820, an input/output interface 830 and a communication interface 840. Herein, the memory 810, the processor 820, the input/output interface 830 and the communication interface 840 are connected through an internal connection path. The memory 810 is configured to store an instruction. The processor 820 is configured to execute the instruction stored in the memory 820 to control the input/output interface 830 to receive inputted data and information and output data such as an operation result, and control the communication interface 840 to send a signal.

The processor 820 is configured to determine state information. The input/output interface 830 is configured to send the state information to a network device. The state information is used to determine a paging manner for paging a remote terminal device.

It is to be understood that the device 800 may correspond to the terminal device in the method 200, may realize corresponding functions of the terminal device in the method 200, which is not elaborated herein for simplicity.

It is to be understood that, in the embodiment of the disclosure, the processor 820 may use a universal CPU, a microprocessor, an ASIC or one or more integrated circuits, to execute a related program to implement the technical solution provided in the embodiment of the disclosure.

It is also to be understood that the communication interface 840 uses but is not limited to, for example, a transceiver device such as a transceiver, to implement communication between the device 800 and another device or communication network.

The memory 810 may include a read-only memory and a random access memory, and provides an instruction and data for the processor 720. A part of the processor 820 may further include a non-volatile random access memory. For example, the processor 820 may further store type information of a device.

FIG. 9 illustrates another method for paging according to an embodiment of the disclosure. It can be understood that interactions, described in the method 1000 shown in FIG. 9, between a relay terminal device and a remote terminal device and between the relay terminal device and a network device are the same as those description in the methods 200 and 300, and thus related descriptions are appropriately omitted for avoiding repetitions.

As shown in FIG. 9, the method 1000 includes S1010 and S1020.

In S1010, the relay terminal device determines state information of the remote terminal device. The state information is used by the network device to determine a paging manner for paging the remote terminal device.

In S1020, the relay terminal device sends the state information to the network device.

As an optional embodiment, S1020 includes an operation as follows. The relay terminal device sends the state information to the network device through an air interface message.

As an optional embodiment, the network device is a first access network device. S1010 includes the following operations.

The relay terminal device sends the state information to the first access network device.

Alternatively, the relay terminal device sends the state information to a first core network device, and the first core network device is configured to send the state information to the first access network device.

Alternatively, the relay terminal device sends the state information to at least one second access network device, and the at least one second access network device is configured to send the state information to the first access network device.

As an optional embodiment, the method 1000 further includes the following operations.

The relay terminal device receives a paging message sent by the first access network device.

The relay terminal device sends the paging message to the remote terminal device.

Figure 10:
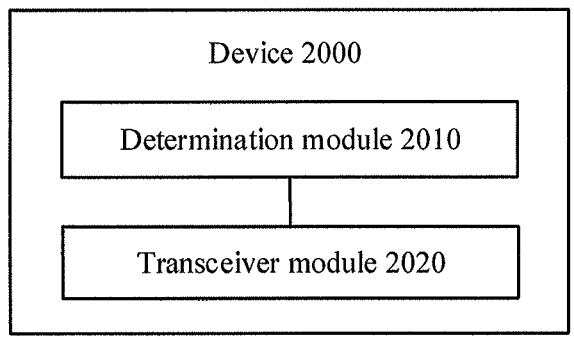
FIG. 10 is a schematic diagram showing another device for paging according to an embodiment of the disclosure.

FIG. 10 is a schematic block diagram of a device 2000 for paging according to an embodiment of the disclosure. The device may be the relay terminal device in the method 1000. As shown in FIG. 10, the device 2000 includes a determination module 2010 and a transceiver module 2020.

The determination module 2010 is configured to determine state information of a remote terminal device. The state information is used by a network device to determine a paging manner for paging the remote terminal device.

The transceiver module 2020 is configured to send the state information to the network device.

The device for paging according to the embodiment of the disclosure determines the state information of the remote terminal device and sends the state information to the network device, the network device determines the paging manner for paging the remote terminal device based on the state information of the remote terminal device, thereby avoiding a paging failure caused by blind paging of the network device, and ensuring that the network device correctly pages the remote terminal device.

As an optional embodiment, the transceiver module 2020 is configured to send the state information to the network device through an air interface message.

As an optional embodiment, the network device is a first access network device.

The transceiver module 2020 is configured to:
send the state information to the first access network device; or,
send the state information to a first core network device, where the first core network device is configured to send the state information to the first access network device; or,
send the state information to at least one second access network device, where the at least one second access network device is configured to send the state information to the first access network device.

As an optional embodiment, the transceiver module 2020 is further configured to:
receive a paging message sent by the first access network device; and
send the paging message to the remote terminal device.

Figure 11:
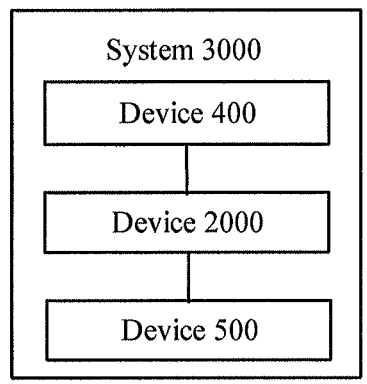
FIG. 11 is a schematic diagram showing another system for paging according to an embodiment of the disclosure.

FIG. 11 is a schematic diagram showing a system for paging 3000 according to an embodiment of the disclosure, which includes a device 400, a device 500 and a device 2000.

Figure 12:
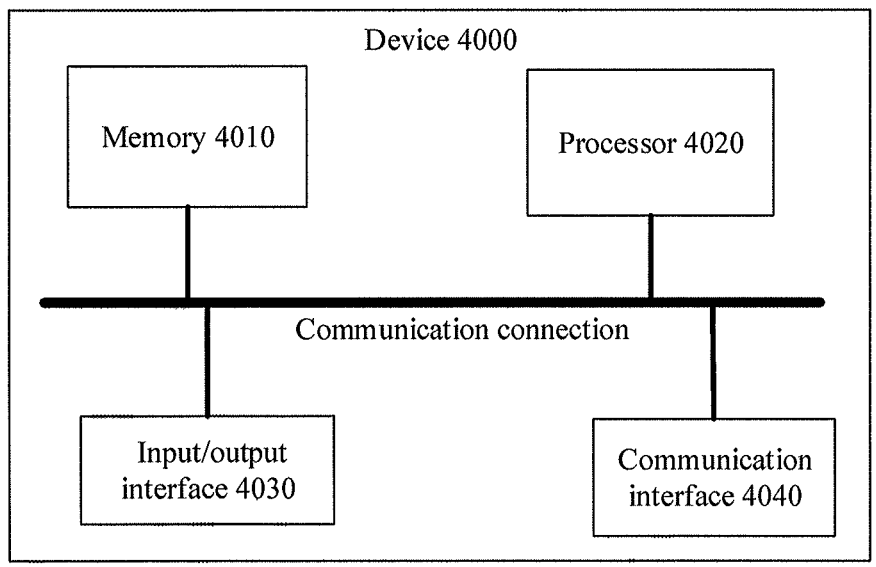
FIG. 12 is a schematic diagram showing another device for paging according to an embodiment of the disclosure.

FIG. 12 is a schematic block diagram of a device 4000 for paging according to an embodiment of the disclosure. The device may be the relay terminal device in the method 1000. As shown in FIG. 12, the device 4000 includes a memory 4010, a processor 4020, an input/output interface 4030 and a communication interface 4040. Herein, the memory 4010, the processor 4020, the input/output interface 4030 and the communication interface 4040 are connected through an internal connection path. The memory 4010 is configured to store an instruction. The processor 4020 is configured to execute the instruction stored in the memory 4020 to control the input/output interface 4030 to receive inputted data and information, output data such as an operation result, and control the communication interface 4040 to send a signal.

The processor 4020 is configured to determine state information of a remote terminal device. The state information is used by a network device to determine a paging manner for paging the remote terminal device. The input/output interface 4030 is configured to send the state information to the network device.

It is to be understood that the device 4000 may correspond to the relay terminal device in the method 1000, may realize corresponding functions of the relay terminal device in the method 1000, which is not elaborated herein for simplicity.

It is to be understood that, in the embodiment of the disclosure, the processor 4020 may adopt a universal CPU, a microprocessor, an ASIC or one or more integrated circuits, to execute a related program to implement the technical solution provided in the embodiment of the disclosure.

It is also to be understood that the communication interface 4040 uses but is not limited to, for example, a transceiver device such as a transceiver to implement communication between the device 4000 and another device or a communication network.

The memory 4010 may include a read-only memory and a random access memory and provides an instruction and data for the processor 4020. A part of the processor 4020 may further include a non-volatile random access memory. For example, the processor 4020 may further store type information of a device.

It is to be understood that term "and/or" in the disclosure only represents an association relationship for describing associated objects, and may represent three relationships. For example, A and/or B may represent three conditions: i.e., only A, both A and B, and only B. In addition, a character "/" in the disclosure generally represents that there is an "or" relationship between two associated objects.

It is to be understood that, in various embodiments of the disclosure, sequence numbers of processes does not mean an execution sequence, and the execution sequence of processes should be determined by a function and an internal logic of each of the processes, and should not form any limit to an implementation process of the embodiments of the disclosure.

Those skilled in the art may realize that units and algorithm steps of each example described in combination with the embodiments disclosed in the disclosure can be implemented by electronic hardware or a combination of computer software and the electronic hardware. Whether these functions are executed in a hardware manner or a software manner depends on specific applications and design constraints of the technical solutions. Professionals may realize described functions with different methods for applications, but such realization shall fall within the scope of the disclosure.

Those skilled in the art may clearly learn about that for operation processes of the system, device and unit described above, reference may be made to the corresponding processes in the above method embodiment, which is not be elaborated herein for convenient and brief description.

In some embodiments provided by the disclosure, it is to be understood that the disclosed system, device and method may be implemented in another manner. For example, the device embodiment described above is only schematic. For example, the units is only divided according to logic functions thereof, and the units may be divided in other manner during practical implementation. For example, multiple units or components may be combined or integrated into another system, or some characteristics may be omitted or not executed. In addition, coupling or direct coupling or a communication connection displayed or discussed may be indirect coupling or communication connection through some interfaces, the devices or the units, and may be electrical and mechanical, or in other forms.

The units described as separate parts may or may not be physically separated, and parts displayed as units may or may not be physical units, that is, may be located in the same place, or may also be distributed to multiple network units. A part or all of the units may be selected to achieve the purpose of the solutions of the embodiments according to a practical requirement.

In addition, all functional units in each embodiment of the disclosure may be integrated into a processing unit, or may also physically exist independently, or two or more than two units may also be integrated into a unit.

If the function is realized in form of software functional unit and sold or used as an independent product, the function may also be stored in a computer-readable storage medium. Based on such an understanding, an essential part or a part making contributions to the related art of the technical solutions of the disclosure or a part of the technical solutions may be embodied in form of software product, and the computer software product is stored in a storage medium. The computer software product includes multiple instructions configured to enable a computer device (which may be a personal computer, a server, a network device or the like) to execute all or a part of the steps of the method in each embodiment of the disclosure. The abovementioned storage medium includes: various media capable of storing program codes such as a U disk, a mobile hard disk, a read-only memory (ROM), a random access memory (RAM), a magnetic disk or an optical disk.

The foregoing is only the specific embodiments of the disclosure, and the scope of protection of the disclosure is not limited thereto. Any variations or replacements easily appreciated by those skilled in the art within the technical scope disclosed by the disclosure shall fall within the scope of protection of the disclosure.

Therefore, the scope of protection of the disclosure shall conform to the scope of protection of the claims.

The invention claimed is:

1. A method for paging, comprising:
   determining, by a remote terminal device, state information; and
   sending, by the remote terminal device, the state information to a network device, wherein the state information is used by the network device to determine a paging manner for paging the remote terminal device, wherein the state information is used to indicate whether the remote terminal device has a subscription relationship and/or a connection relationship with a relay terminal device, and is used to indicate whether the remote terminal device is within coverage of a network.

2. The method of claim 1, wherein the sending, by the remote terminal device, state information to a network device comprises:
   sending, by the remote terminal device, the state information to the network device through an air interface message, or
   sending, by the remote terminal device, the state information to the network device through the relay terminal device.

3. The method of claim 1, wherein the determining, by the remote terminal device, state information comprises:
   determining, by the remote terminal device, the state information based on quality information on a link between the remote terminal device and the network device, and/or based on quality information on a link between the remote terminal device and a relay terminal device having a subscription relationship and/or a connection relationship with the remote terminal device.

4. The method of claim 1, wherein the sending, by the remote terminal device, the state information to a network device comprises:
   sending, by the remote terminal device, the state information to a first access network device; or
   sending, by the remote terminal device, the state information to a first core network device; or
   sending, by the remote terminal device, the state information to at least one second access network device.

5. The method of claim 4, after the sending, by the remote terminal device, the state information to a network device, further comprising:
   receiving, by the remote terminal device, a paging message sent by the first access network device based on the state information.

6. The method of claim 5, wherein the receiving, by the remote terminal device, a paging message sent by the first access network device based on the state information comprises:
   in responsive to that the state information indicates that the remote terminal device is within coverage of a network, monitoring, by the remote terminal device, an air interface message, and receiving, by the remote terminal device, the paging message sent by the first access network device through the air interface message.

7. The method of claim 5, wherein the receiving, by the remote terminal device, a paging message sent by the first access network device based on the state information comprises:
   in responsive to that the state information indicates that the remote terminal device has a subscription relationship and/or a connection relationship with the relay terminal device, receiving, by the remote terminal device, the paging message sent by the first access network device through the relay terminal device.

8. The method of claim 7, wherein in responsive to that the state information indicates that the remote terminal device has a subscription relationship and/or a connection relationship with the relay terminal device, the receiving, by the remote terminal device, the paging message sent by the first access network device through the relay terminal device comprises:
   in responsive to that the state information indicates that the remote terminal device has a subscription relationship and/or a connection relationship with the relay terminal device and the remote terminal device is within coverage of a network, receiving, by the remote terminal device, the paging message sent by the first access network device through the relay terminal device.

9. The method of claim 5, wherein the receiving, by the remote terminal device, a paging message sent by the first access network device based on the state information comprises:
   in responsive to that the state information indicates that the remote terminal device has no subscription relationship and/or connection relationship with the relay terminal device and the remote terminal device is out of coverage of a network, receiving, by the remote terminal device, the paging message sent by the first access network device through the relay terminal device.

10. A device for paging, comprising:
    a processor;
    an input/output interface; and
    a memory for storing instructions executable by the processor, wherein the processor is configured to execute the instructions to determine state information; and the input/output interface is configured to send the state information to a network device, wherein the state information is used by the network device to determine a paging manner for paging the remote terminal device, wherein the state information is used to indicate whether the remote terminal device has a subscription relationship and/or a connection relationship with a relay terminal device, and is used to indicate whether the remote terminal device is within coverage of a network.

11. The device of claim 10, wherein the input/output interface is configured to:

send the state information to the network device through an air interface message, or send the state information to the network device through the relay terminal device.

12. The device of claim 10, wherein the processor is configured to:

determine the state information based on quality information on a link between the device and the network device, and/or based on quality information on a link between the device and a relay terminal device having a subscription relationship and/or a connection relationship with the device.

13. The device of claim 10, wherein the input/output interface is configured to:

send the state information to a first access network device; or, send the state information to a first core network device; or, send the state information to at least one second access network device.

14. The device of claim 13, wherein the input/output interface is further configured to:

after the sending the state information the network device, receive a paging message sent by the first access network device based on the state information.

15. The device of claim 14, wherein the input/output interface is further configured to:

in responsive to that the state information indicates that the device is within coverage of a network, monitor an air interface message and receive the paging message sent by the first access network device through the air interface message.

16. The device of claim 14, wherein the input/output interface is further configured to:

in responsive to that the state information indicates that the device has a subscription relationship and/or a connection relationship with the relay terminal device, receive the paging message sent by the first access network device through the relay terminal device.

17. The device of claim 16, wherein the input/output interface is further configured to:

in responsive to that the state information indicates that the device has the subscription relationship and/or the connection relationship with the relay terminal device and the device is within coverage of a network, receive the paging message sent by the first access network device through the relay terminal device.

18. The device of claim 14, wherein the input/output interface is further configured to:

in responsive to that the state information indicates that the device has no subscription relationship and/or connection relationship with the relay terminal device and the device is out of coverage of a network, receive the paging message sent by the first access network device through the relay terminal device.

* * * * *